(12) United States Patent
Donnellan et al.

(10) Patent No.: US 8,448,171 B2
(45) Date of Patent: May 21, 2013

(54) COMMUNICATIONS BETWEEN VIRTUAL MACHINES THAT HAVE BEEN MIGRATED

(75) Inventors: Sean Donnellan, Gaertringen (DE); Chitra Dorai, Chappaqua, NY (US); Anees A. Shaikh, Yorktown Heights, NY (US); Kunwadee Sripanidkulchai, Bangkok (TH)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 12/986,758

(22) Filed: Jan. 7, 2011

(65) Prior Publication Data
US 2012/0180044 A1    Jul. 12, 2012

(51) Int. Cl.
*G06F 9/455*    (2006.01)
(52) U.S. Cl.
USPC ............................................. 718/1; 719/313
(58) Field of Classification Search
USPC .............................................. 718/1; 719/313
See application file for complete search history.

(56) References Cited

U.S. PATENT DOCUMENTS

| | | | |
|---|---|---|---|
| 8,121,146 B2* | 2/2012 | Sood et al. | 370/466 |
| 8,234,406 B2* | 7/2012 | Loupia | 709/245 |
| 2010/0257269 A1* | 10/2010 | Clark | 709/226 |
| 2010/0322255 A1* | 12/2010 | Hao et al. | 370/398 |
| 2011/0075667 A1* | 3/2011 | Li et al. | 370/392 |
| 2011/0131576 A1* | 6/2011 | Ikegaya et al. | 718/1 |
| 2011/0283278 A1* | 11/2011 | Murrell et al. | 718/1 |

OTHER PUBLICATIONS

Mell et al., "The NIST Definition of Cloud Computing", Version 15, Oct. 7, 2009, pp. 1-2.

* cited by examiner

*Primary Examiner* — Andy Ho
(74) *Attorney, Agent, or Firm* — Yee & Associates, P.C.; Louis J. Percello

(57) ABSTRACT

A method, apparatus, and computer program product for managing communications between a plurality of applications are presented. A determination is made as to whether an address in a message is a prior address for a second application in the plurality of applications in response to receiving a message from a first application in the plurality of applications. The message is sent onto a virtual network configured to handle prior addresses for the plurality of applications in response to the address in the message being the prior address for the second application being located on another virtual machine from the first application.

25 Claims, 11 Drawing Sheets

COMMUNICATIONS BETWEEN VIRTUAL MACHINES THAT HAVE BEEN MIGRATED

BACKGROUND

1. Field

The present disclosure relates generally to an improved data processing system and, in particular, to virtual machines that have been migrated. Still more particularly, the present disclosure relates to a method and apparatus for managing communications between applications running on virtual machines that have been migrated.

2. Description of the Related Art

The Internet, also referred to as an internetwork, is a set of computer networks. The set of computers may be dissimilar and joined together by gateways. The gateways handle data transfer and the conversion of messages from a protocol of a sending network to a protocol used by a receiving network. When capitalized, the term "Internet" refers to the collection of networks and gateways that use the Transmission Control Protocol/Internet Protocol (TCP/IP) suite of protocols. The Internet may carry information and provide services. The information and services include, for example, electronic mail, online chat services, file transfers, web pages, and other resources.

Internet protocols identify computing devices in a network using a hostname and/or an Internet Protocol address (IP address). The hostname is a label assigned to computing devices for indicating the name of the computing device in the network. The Internet Protocol address of the computing device indicates a location of the computing device and a route to get data to the computing device.

The Internet is a commonly used source of information and entertainment. Further, the Internet is also used as a medium for business activities. Many businesses, government entities, and other organizations have a presence on the Internet using websites to perform various transactions. Various organizations may offer goods and services. These goods and services may involve a sale of goods that are to be shipped to a customer. The goods also may be software and/or data purchased by a customer and transferred over the Internet to the customer.

Websites and other resources on the Internet may be provided through the use of servers. These servers may take the form of computers or software implementations of computers. Virtual machines may be used to provide services to different users on the Internet, as well as on other types of networks. For example, virtual machines may be used to respond to requests by users to a website for performing different transactions. These transactions may include, for example, without limitation, sales of goods and services.

A virtual machine is a software implementation of a machine that processes instructions like a physical version of the machine. In these examples, the virtual machine runs on a computer. Many virtual machines may run on a single computer. When multiple virtual machines are present, these virtual machines share the physical resources in the computer on which the virtual machines run. Each virtual machine may run its own operating system on the computer. Each virtual machine may have its own set of applications or processes.

A virtual machine may be moved from one location to another location. For example, the virtual machine may be moved from one computer to another computer. This type of movement is often referred to as a relocation or migration of the virtual machine. For example, a virtual machine may be migrated from a local area network to a cloud-based infrastructure. In another example, the location that the virtual machine is moved to may be local or remote.

The migration of the virtual machine may occur while the virtual machines are live. In other words, the virtual machines may still be responding to requests from clients while the migration of virtual machines occurs. A virtual machine within the virtual machines responding to requests may be halted while that virtual machine is migrated from one location to another location. After the virtual machine has been migrated, that virtual machine may then be restarted to respond to requests. As a result, virtual machines may respond to requests at the locations until all of the virtual machines have been migrated.

The migration process may be time consuming and costly. Migration of virtual machines involves setting up computers for the virtual machines. These computers are set up and tested before the migration of the virtual machines occurs. Further, with migrating virtual machines, while they are live, the virtual machines are tested on the computers before the virtual machines start responding to requests. Depending on the results of the tests, changes or modifications to the virtual machines being tested and the applications are performed. This process may take longer and cost more than desired.

Therefore, it would be advantageous to have a method and apparatus that takes into account at least some of the issues discussed above, as well as possibly other issues.

SUMMARY

The different illustrative embodiments provide a method, apparatus, and computer program product for managing communications between a plurality of applications. In an illustrative embodiment, a determination is made as to whether an address in a message is a prior address for a second application in the plurality of applications in response to receiving a message from a first application in the plurality of applications. The message is sent onto a virtual network configured to handle prior addresses for the plurality of applications in response to the address in the message being the prior address for the second application being located on another virtual machine from the first application.

DETAILED DESCRIPTION

Figure 1:
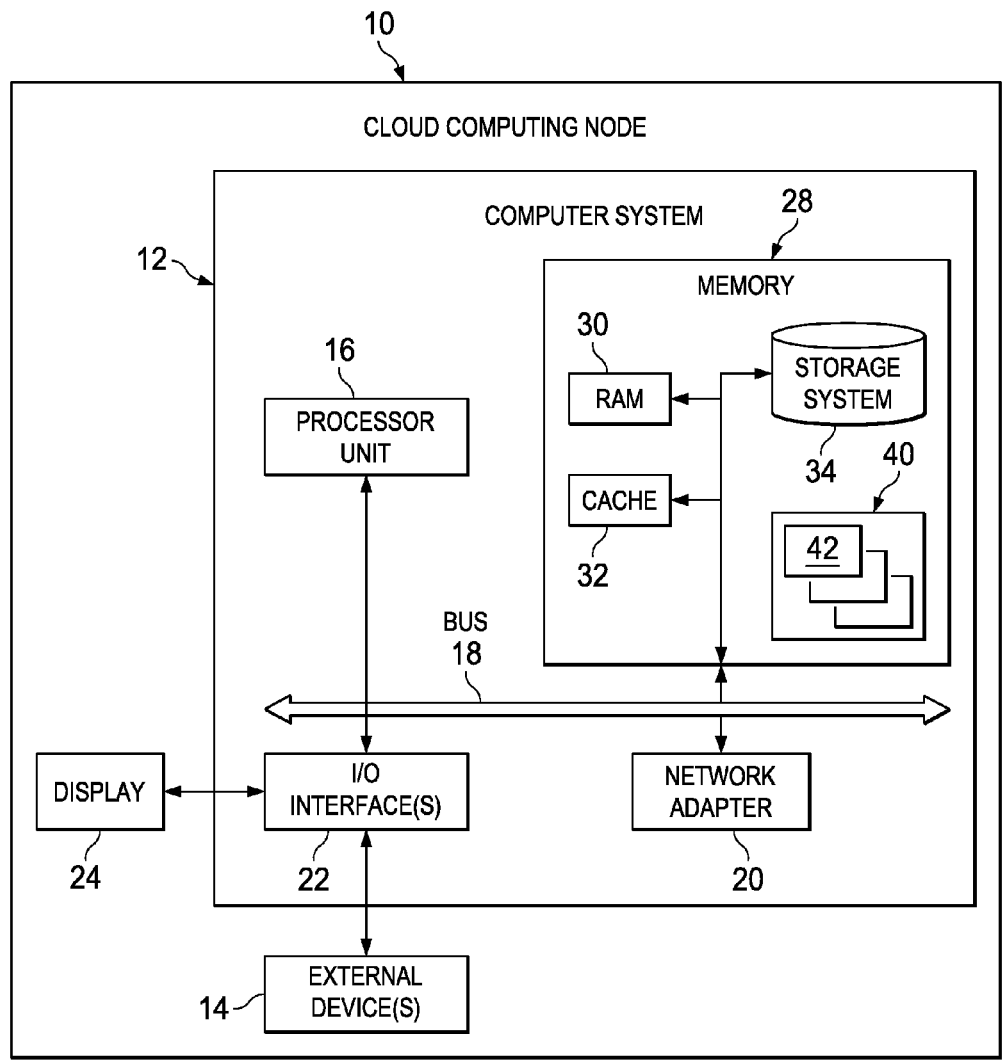
FIG. 1 is an illustration of a block diagram of a cloud computing node in accordance with an illustrative embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer readable medium(s) may be utilized. The computer readable medium may be a computer readable signal medium or a computer readable storage medium. A computer readable storage medium may be, for example, without limitation, an electronic, magnetic, optical, electromagnetic, infrared or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, without limitation, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language, such as Java, Smalltalk, C++, or the like; and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which run on the computer or other programmable apparatus provide processes for implementing the functions/acts specified in the flowchart and/or block diagram block or blocks.

It is understood in advance that, although this disclosure includes a detailed description on cloud computing, implementation of the teachings recited herein are not limited to a cloud computing environment. Rather, the illustrative embodiments are capable of being implemented in conjunction with any other type of computing environment now known or later developed.

For convenience, the Detailed Description includes the following definitions, which have been derived from the "Draft NIST Working Definition of Cloud Computing" by Peter Mell and Tim Grance, dated Oct. 7, 2009, which is cited in an information disclosure statement filed herewith.

Cloud computing is a model of service delivery for enabling convenient, on-demand network access to a shared pool of configurable computing that can be rapidly provisioned and released with minimal management effort or interaction with a provider of the service. The computer resources may be, for example, resources networks, network bandwidth, servers, processing, memory, storage, applications, virtual machines, and services. This cloud model may include at least five characteristics, at least three service models, and at least four deployment models.

Characteristics include on-demand self-service, broad network access, resource pooling, rapid elasticity, and measured service. With on-demand self-service, a cloud consumer can unilaterally provision computing capabilities as needed automatically without requiring human interaction with the service's provider. The computer capabilities include, for example, server time and network storage.

Broad network access involves capabilities that are available over a network and accessed through standard mechanisms that promote use by heterogeneous thin or thick client platforms, such as mobile phones, laptops, and personal digital assistants (PDAs). With resource pooling, the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify location at a higher level of abstraction. The higher level of abstraction may be, for example, a country, state, or data center.

Rapid elasticity involves capabilities that can be rapidly and elastically provisioned, in some cases automatically, to quickly scale out and are rapidly released to quickly scale in. To the consumer, the capabilities available for provisioning often appear to be unlimited and can be purchased in any quantity at any time.

With measured service, cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service models include software as a service (SaaS), platform as a service (PaaS), and infrastructure as a service (IaaS). With software as a service (SaaS), a capability is provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a service (PaaS) is a capability provided to the consumer to deploy onto the cloud infrastructure consumer-created or acquired applications created using programming languages and tools supported by the provider. The consumer does not manage or control the underlying cloud infrastructure including networks, servers, operating systems, or storage. Instead, the consumer has control over the deployed applications and possibly application hosting environment configurations.

Infrastructure as a service (IaaS) is a capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components. These network components include, for example, host firewalls.

Deployment models include, for example, a private cloud, a community cloud, a public cloud, and a hybrid cloud. A private cloud has a cloud infrastructure that is operated solely for an organization. This type of cloud may be managed by the organization or a third party and may exist on-premises or off-premises.

A community cloud is the cloud infrastructure shared by several organizations that supports a specific community that has shared concerns. These concerns include, for example, mission, security requirements, policy, and compliance considerations. A community cloud may be managed by the organizations or a third party. This type of cloud may exist on-premises or off-premises.

Public cloud: the cloud infrastructure is made available to the general public or a large industry group and is owned by an organization selling cloud services.

Hybrid cloud: the cloud infrastructure is a composition of two or more clouds. For example, without limitation, a hybrid cloud may be a combination of two or more of a private cloud, a community cloud, and/or public cloud. A hybrid cloud includes clouds that remain unique entities, but are bound together by standardized or proprietary technology that enables data and application portability. The data and application portability includes, for example, cloud bursting for load-balancing between clouds that form the hybrid cloud.

A cloud computing environment is a service oriented with a focus on statelessness, low coupling, modularity, and semantic interoperability. At the heart of cloud computing is an infrastructure comprising a network of interconnected nodes.

With reference now to FIG. 1, a block diagram of an example of a cloud computing node is depicted in accordance with an illustrative embodiment. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-processing instructions, such as program modules, being processed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and/or remote computer system storage media including memory storage devices.

As depicted in FIG. 1, computer system 12 in cloud computing node 10 is shown in the form of a general-purpose computing device. The components of computer system 12 may include, but are not limited to, one or more processors or processor unit 16, memory 28, and bus 18 that couples various system components, including memory 28, to processor unit 16.

Processor unit 16 processes instructions for software that may be loaded into memory 28. Processor unit 16 may be a number of processors, a multi-processor core, or some other type of processor, depending on the particular implementation. A number, as used herein with reference to an item, means one or more items. Further, processor unit 16 may be implemented using a number of heterogeneous processor systems in which a main processor is present with secondary processors on a single chip. As another illustrative example, processor unit 16 may be a symmetric multi-processor system containing multiple processors of the same type.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12 and includes both volatile and non-volatile media and removable and non-removable media.

Memory 28 can include computer system readable media in the form of volatile memory, such as random access memory (RAM) 30 and/or cache 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM, or other optical media can be provided. In such instances, each can be connected to bus 18 by one or more data media interfaces. As will be further depicted and described below, memory 28 may include at least one program product having a set of program modules that are configured to carry out the functions of embodiments of the invention. As used herein, a set, when referring to items, means one or more items. For example, a set of program modules is one or more program modules.

Program/utility 40, having a set of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external device(s) 14, such as a keyboard, a pointing device, display 24, etc.; one or more devices that enable a user to interact with computer system 12; and/or any devices (e.g., network card, modem, etc.) that enable computer system 12 to communicate with one or more other computing devices. Such communication can occur via I/O interface(s) 22. Still yet, computer system 12 can communicate with one or more networks, such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to, microcode, device drivers, redundant processor units, external disk drive arrays, RAID systems, tape drives, and data archival storage systems, etc.

Figure 2:
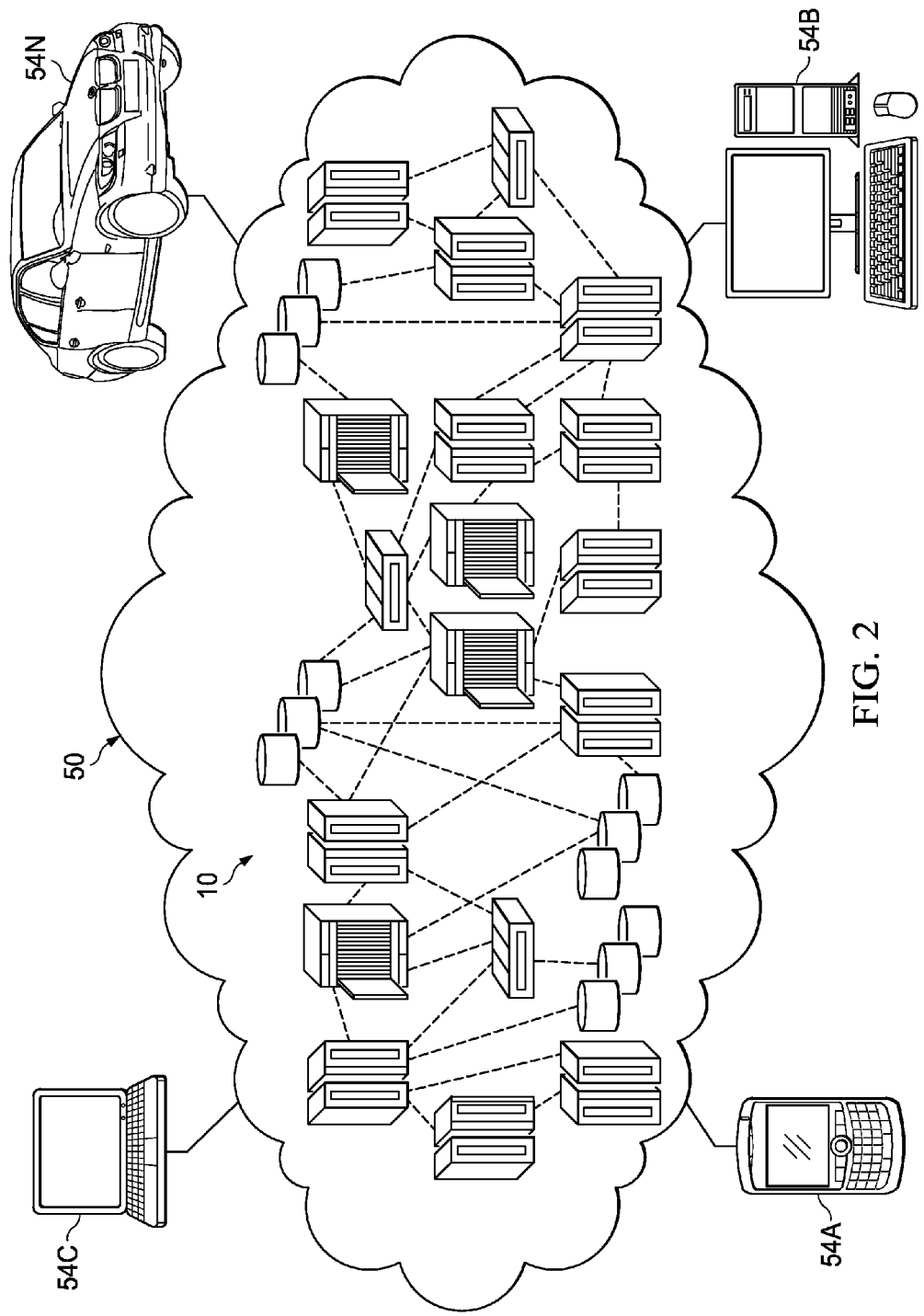
FIG. 2 is an illustration of a cloud computing environment in accordance with an illustrative embodiment.

Referring now to FIG. 2, an illustration of a cloud computing environment is depicted in accordance with an illustrative embodiment. As illustrated, cloud computing environment 50 comprises one or more cloud computing nodes, such as cloud computing node 10 in FIG. 1. The one or more cloud computing nodes may communicate with local computing devices used by cloud consumers, such as, for example, without limitation, personal digital assistant (PDA) or cellular telephone 54A, desktop computer 54B, laptop computer 54C, and/or automobile computer system 54N. Cloud computing node 10 may communicate with other cloud computing nodes. They may be grouped (not shown) physically or virtually in one or more networks, such as Private, Community, Public, or Hybrid clouds, as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser). Program code located on one of cloud computing nodes 10 may be stored on a computer recordable storage medium in one of cloud computing nodes 10 and downloaded to a computing device within computing devices 54A-N over a network for use in these computing devices. For example, a server computer in cloud computing nodes 10 may store program code on a computer readable storage medium on the server computer. The server computer may download the program code to a client computer in computing devices 54A-N for use on the client computer.

Figure 3:
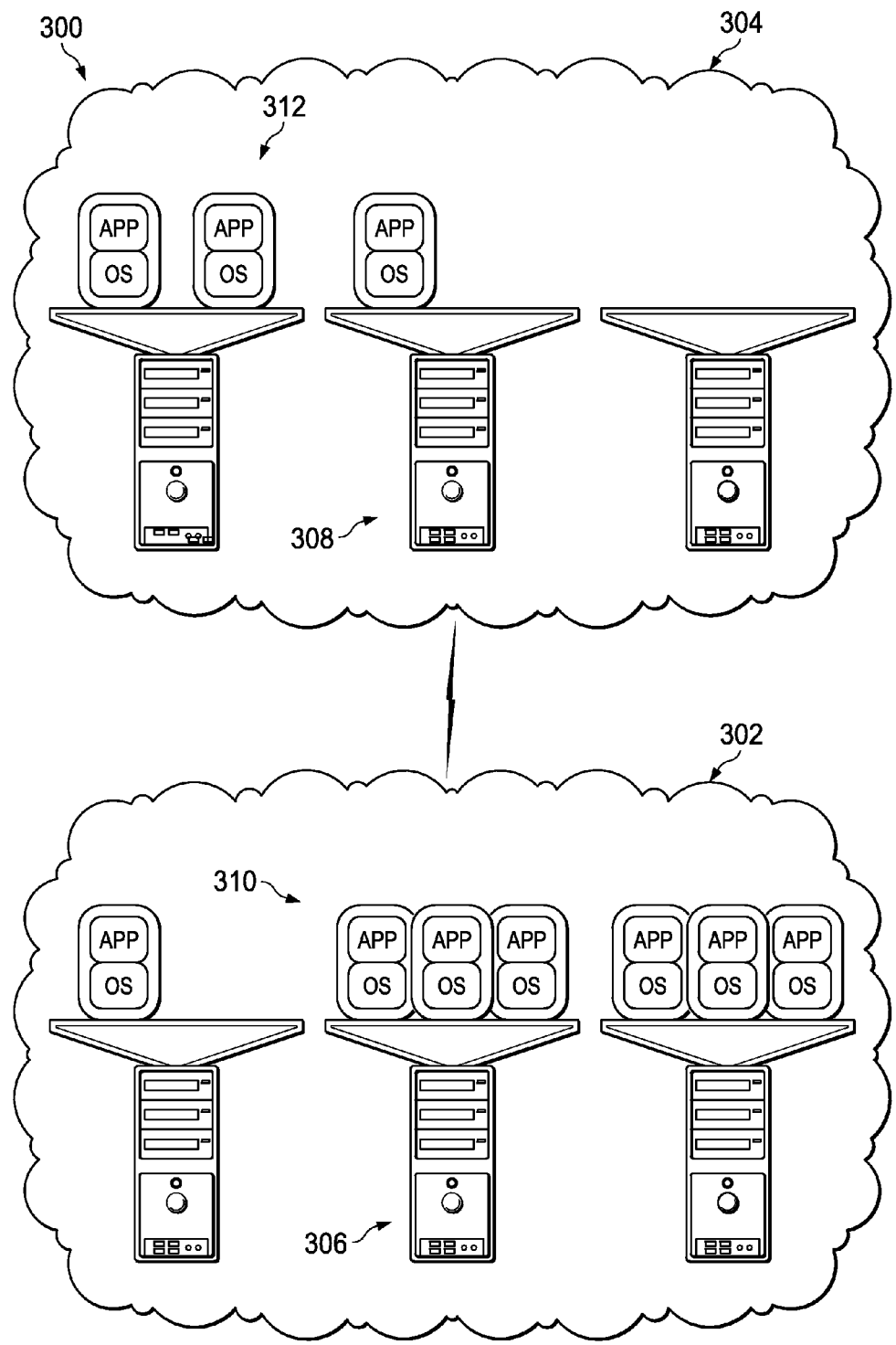
FIG. 3 is an illustration of a set of cloud computing environments in accordance with an illustrative embodiment.

With reference now to FIG. 3, an illustration of a set of cloud computing environments is depicted in accordance with an illustrative embodiment. In these illustrative examples, set of cloud computing environments 300 is an example of cloud computing environment 50 in FIG. 2. Set of cloud computing environments 300 includes private cloud 302 and public cloud 304.

In these illustrative examples, private cloud 302 is a cloud computing environment. Private cloud 302 includes resources 306. Resources 306 are computing nodes within the private cloud. Resources 306 are an example of cloud computing nodes 10 in FIG. 2. Private cloud 302 is private in that resources 306 may only be accessed by devices that are part of private cloud 302. For example, private cloud 302 may be private to a company, a location, an organization, a local network, and/or any other set of users. On the other hand, public cloud 304 is public. Resources 308 in public cloud 304 may be accessed by a number of devices.

In some illustrative embodiments, virtual machines 310 operating on resources 306 may be moved from private cloud 302 to public cloud 304. In other illustrative embodiments, virtual machines 312 operating on resources 308 may be moved from public cloud 304 to private cloud 302.

Figure 4:
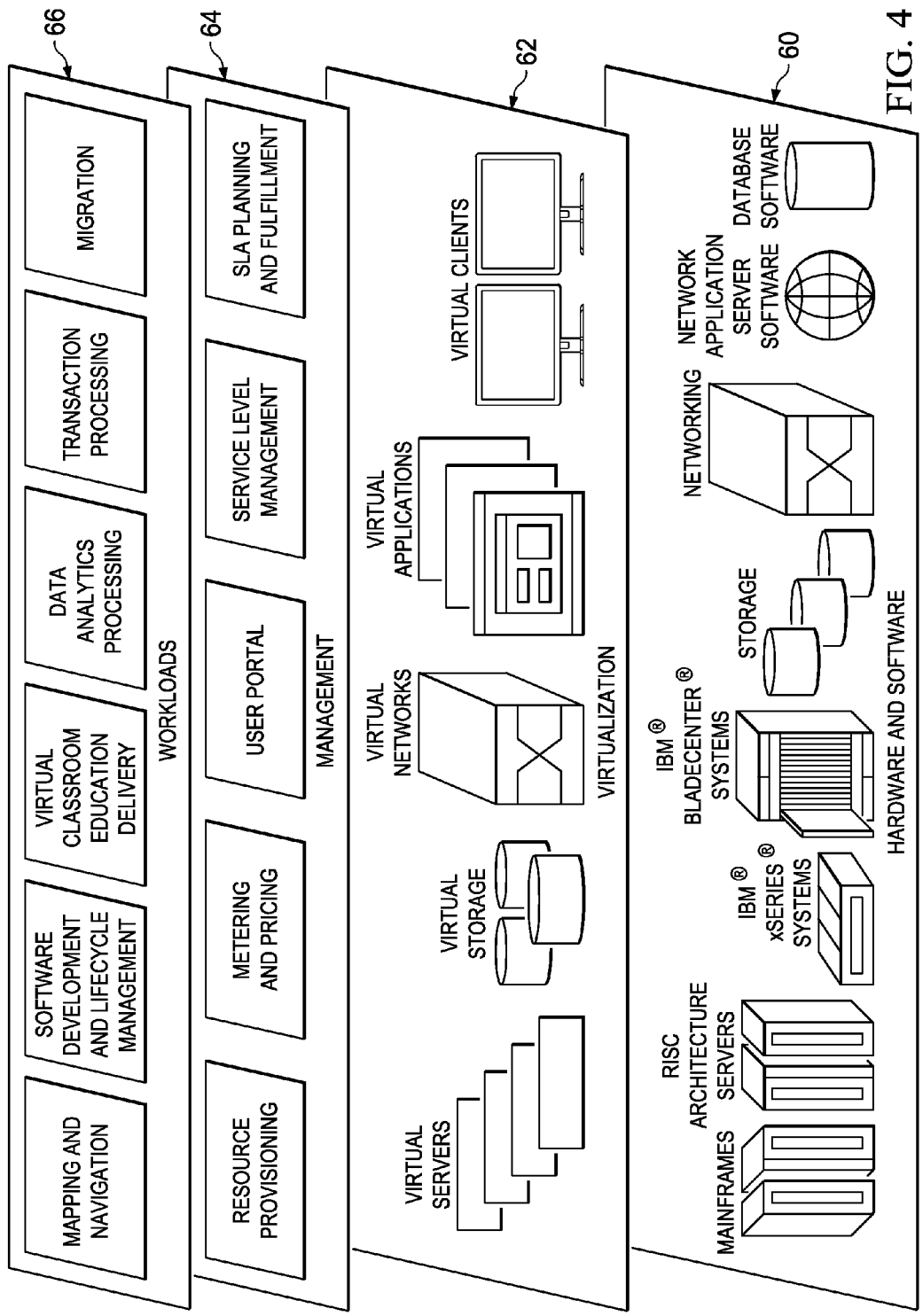
FIG. 4 is an illustration of model layers in accordance with an illustrative embodiment.

With reference now to FIG. 4, an illustration of model layers is depicted in accordance with an illustrative embodiment. The model layers are a set of functional abstraction layers provided by a cloud computing environment, such as cloud computing environment 50 in FIG. 2. It should be understood in advance that the components, layers, and functions shown in FIG. 4 are intended to be illustrative only, and embodiments of the invention are not limited thereto. As depicted, the following layers and corresponding functions are provided:

Hardware and software layer 60 includes hardware and software components. Examples of hardware components include mainframes, for example, IBM® zSeries® systems; RISC (Reduced Instruction Set Computer) architecture based servers, for example, IBM pSeries® systems, IBM xSeries® systems, and IBM BladeCenter® systems; storage devices; networks; and networking components. Examples of software components include network application server software, for example, IBM WebSphere® application server software; and database software, for example, IBM DB2® database software. (IBM, zSeries, pSeries, xSeries, Blade-Center, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions, which may be provided from this layer include: mapping and navigation, software development and lifecycle management, virtual classroom education delivery, data analytics processing, transaction processing, and migration. One or more of the different illustrative embodiments may be implemented within migration within workloads layer 66.

Figure 5:
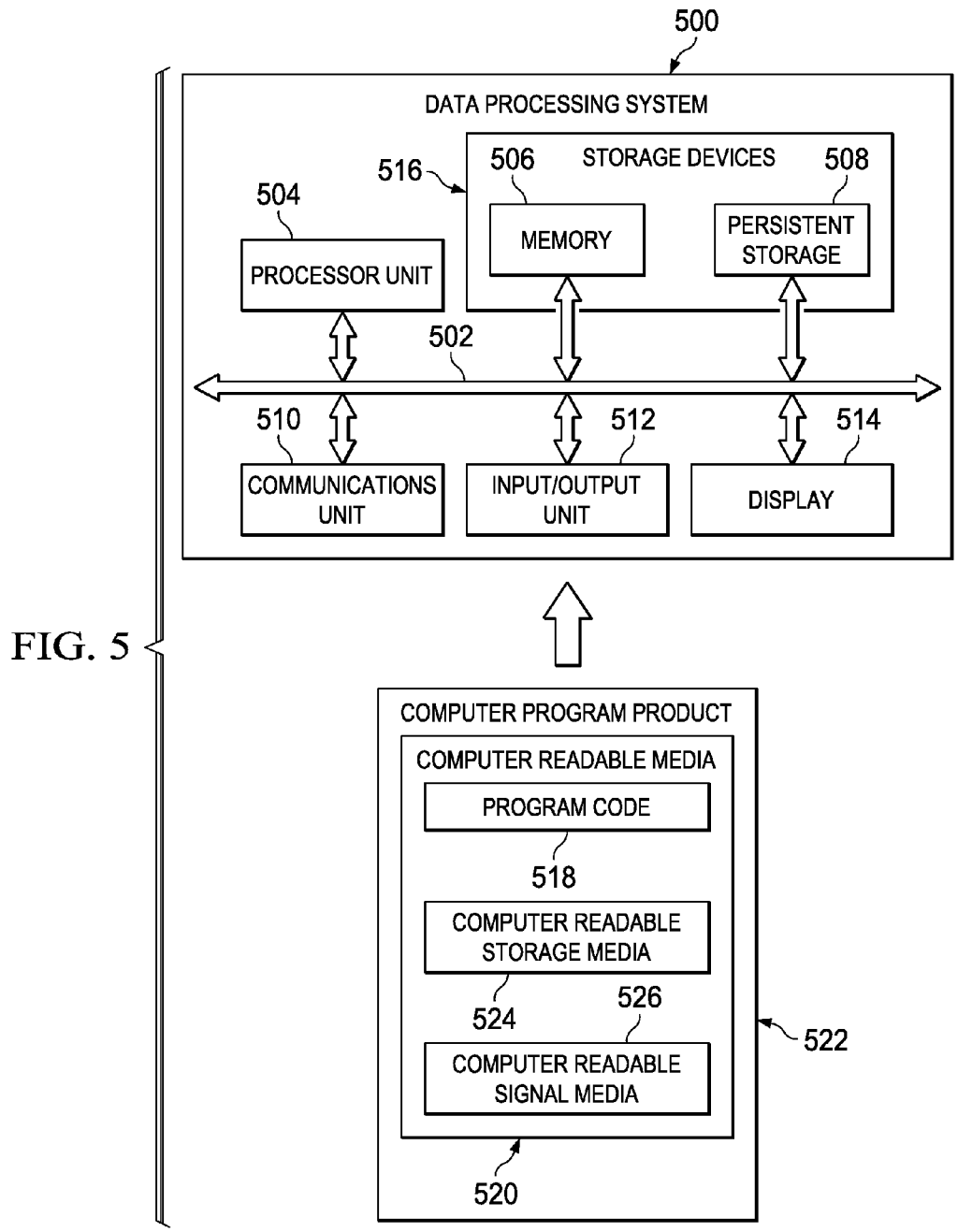
FIG. 5 is an illustration of a data processing system in accordance with an illustrative embodiment.

Turning now to FIG. 5, a block diagram of a data processing system is depicted in accordance with an illustrative embodiment. In this illustrative example, data processing system 500 includes communications fabric 502, which provides communications between processor unit 504, memory 506, persistent storage 508, communications unit 510, input/output (I/O) unit 512, and display 514.

Processor unit 504 serves to process instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for processing by processor unit 504. The processes of the different embodiments may be performed by processor unit 504 using computer implemented instructions, which may be located in a memory, such as memory 506.

These instructions are referred to as program code, computer usable program code, or computer readable program code that may be read and processed by a processor in processor unit 504. The program code in the different embodiments may be embodied on different physical or tangible computer readable media, such as memory 506 or persistent storage 508.

Program code 518 is located in a functional form on computer readable media 520 that is selectively removable and may be loaded onto or transferred to data processing system 500 for processing by processor unit 504. Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500. In these illustrative examples, computer readable storage media 524 is a non-transitory computer readable storage medium.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to, or in place of, those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

As another example, a storage device in data processing system 500 is any hardware apparatus that may store data. Memory 506, persistent storage 508, and computer readable media 520 are examples of storage devices in a tangible form.

The different illustrative embodiments recognize and take into account a number of different considerations. For example, the different illustrative embodiments recognize and take into account that the modification of application configurations may include changing original Internet Protocol addresses to new Internet Protocol addresses. Such modifications may involve changes to application configurations that contain Internet Protocol addresses. The different illustrative embodiments recognize and take into account that such changes are manual, tedious, and may be error-prone.

The different illustrative embodiments recognize and take into account that a reduction in an amount of manual configuration changes of applications is desirable. The different illustrative embodiments also recognize and take into account that reduction in the amount of time to test the configuration of the applications is desirable. A reduction in the amount of manual configuration can reduce the amount of time and resources needed to move a virtual machine.

The different illustrative embodiments recognize and take into account that one manner in which the reduction of the use of time and resources needed to move a virtual machine is to automate the process to migrate the virtual machine. When a virtual machine is relocated to a different physical location, the Internet Protocol address of the virtual machine may change. Internet Protocol addresses may be routed through a virtual Internet Protocol address routing process configured for use at the desired destination.

The different illustrative embodiments recognize and take into account that the transfer of virtual machines may use resources on the network and resources in terms of personnel. The different illustrative embodiments recognize and take into account that a number of factors are present in identifying the amount of configuration changes to migrate the virtual machines. These factors include, for example, the range of Internet Protocol addresses used by applications, the number of Internet Protocol addresses used by applications in the virtual machine, the number of application modules, the versions of the application modules, and the number of virtual machines being migrated for a multi-tier application.

In some cases, The different illustrative embodiments recognize and take into account that the amount of configuration changes to migrate the virtual machines may be greater than desired. The process of making the configuration changes may be manual, error-prone, and costly. The process of making the configuration changes may also be time consuming, because the process may require testing prior to declaring the migrated virtual machine ready.

The different illustrative embodiments further recognize and take into account that the virtual machines migrated may include applications that are multi-tier applications. Multi-tier applications are applications located on more than one virtual machine. Each tier in a multi-tier application may be located on a separate virtual machine. The virtual machines containing the tiers are configured to work together to process requests for the multi-tier application. Requests from clients to multi-tier applications are handled by servers in each tier and across tiers based on application logic and dependencies between the tiers in the multi-tier application.

The different illustrative embodiments recognize and take into account that when migrating multi-tier applications from one network location to another network location, the migrated virtual machines running the applications may need to have different Internet Protocol address. Thus, the tiers in the multi-tiered applications that are configured on each server may contain references to Internet Protocol addresses in the original network location. These references are ones that do not work in the new network location.

The different illustrative embodiments further recognize and take into account that automation of migration and Internet Protocol address routing by a virtual machine requires resources on the computer on which the virtual machine is located. For example, resources are used to identify the application components and configuration data. The resources used may include processor units, communications units, and memory. Resources also may generate new configuration data for use at the destination server and to perform the migration of the virtual machine. Additionally, resources are used to identify and route inbound and outbound Internet Protocol addresses using protocol events. The use of resources for these steps may reduce the performance of other operations on the computer.

As an illustrative example, a computer may host a number of virtual machines. The processing of requests by these virtual machines may be slowed when processor resources are also used by a virtual machine migration process or by a virtual machine Internet Protocol address routing process. Consequently, the different illustrative embodiments recognize and take into account that generating a configuration for a virtual machine at the destination may not always be desirable.

Thus, the different illustrative embodiments provide a method, apparatus, and computer program product for managing communications between a plurality of applications. In an illustrative embodiment, a determination is made as to whether an address in a message is a prior address for a second application in the plurality of applications in response to receiving a message from a first application in the plurality of applications. The message is sent onto a virtual network configured to handle prior addresses for the plurality of applications in response to the address in the message being the prior address for the second application being located on another virtual machine from the first application.

Figure 6:
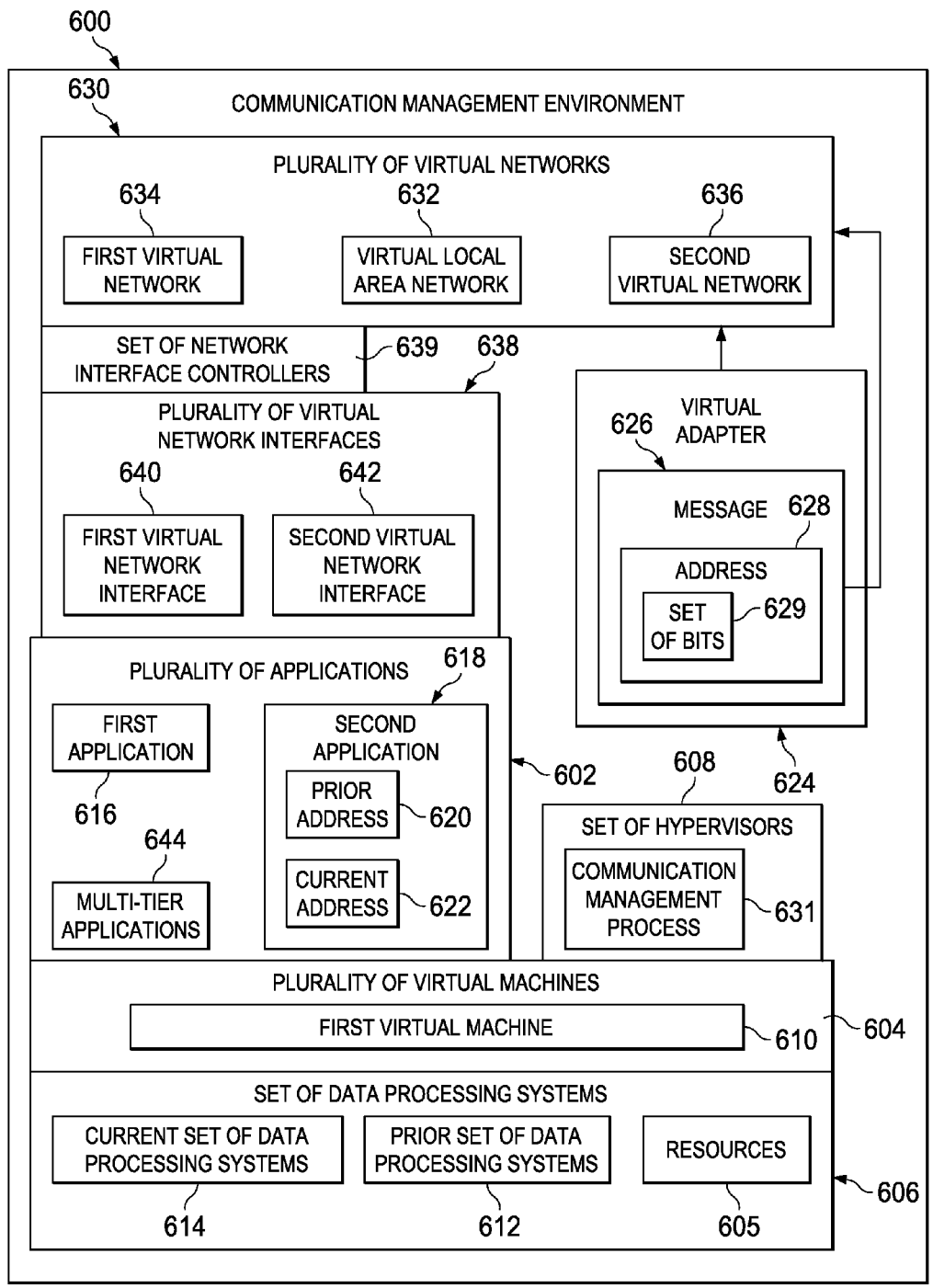
FIG. 6 is an illustration of a block diagram of a communication management environment in accordance with an illustrative embodiment.

With reference now to FIG. 6, an illustration of a communication management environment is depicted in accordance with an illustrative embodiment. Communication management environment 600 is an environment in which illustrative embodiments may be implemented. In these illustrative embodiments, communication management environment 600 may be implemented in a cloud computing environment, such as cloud computing environment 50 in FIG. 2.

In these illustrative embodiments, plurality of applications 602 is located on plurality of virtual machines 604. For example, one or more applications in plurality of applications 602 may be running on one or more virtual machines in plurality of virtual machines 604. In these examples, an application is program code that performs a set of functions. An application can be formed from one or more computer programs. An application also may include other components, such as, for example, a dynamic link library, a library of functions, a configuration file, a log, a graphical user interface, application program interfaces, and other suitable components. An application may be, for example, without limitation, a word processor, a database, middleware, or a video game.

Plurality of virtual machines 604 operates on set of data processing systems 606. For example, plurality of virtual machines 604 uses resources 605 in set of data processing systems 606. In these examples, set of data processing systems 606 includes physical resources. For example, set of data processing systems 606 is an example of one embodiment of data processing system 500 in FIG. 5. Set of hypervisors 608 manages plurality of virtual machines 604. A hypervisor is software that allows more than one cooperating system or virtual machine to run on a data processing system at the same time. For example, set of hypervisors 608 manages the use of resources 605 in set of data processing systems 606. In another example, set of hypervisors 608 runs operating systems for plurality of virtual machines 604.

In these illustrative examples, applications in plurality of applications 602 have been migrated. For example, first virtual machine 610 may have been migrated from prior set of data processing systems 612 to current set of data processing systems 614. First virtual machine 610 may be running first application 616 and/or second application 618. When first virtual machine 610 is migrated to current set of data processing systems 614, applications running on first virtual machine 610 are migrated as well.

For example, when second application 618 is migrated from one data processing system to another, the address for second application 618 may change. Prior set of data processing systems 612 may have a range of Internet Protocol addresses for connections in prior set of data processing systems 612. Similarly, current set of data processing systems 614 may have another range of Internet Protocol addresses for connections in current set of data processing systems 614. Thus, when second application 618 is migrated, the address for second application 618 changes from prior address 620 to current address 622.

Applications within plurality of applications 602 may communicate with each other. Additionally, for example, first application 616 may include components that communicate with other components within first application 616. The communications within plurality of applications 602 may be made by including Internet Protocol addresses, hostnames, and/or other identifiers in messages.

Communication management environment 600 includes virtual adapter 624 for managing communications between applications in plurality of applications 602. In these examples, virtual adapter 624 is a program that provides connections to a network. For example, virtual adapter 624 may be a set of protocols for transferring messages received to a virtual network such as plurality of virtual networks 630 discussed below. Virtual adapter 624 may use hardware, such as a router or switch to physically transfer the message. In these illustrative embodiments, first application 616 may generate message 626 to be sent to second application 618. In order to have message 626 sent to second application 618, address 628 is included in message 626. Address 628 may be prior address 620 or current address 622.

In these examples, virtual adapter 624 identifies set of bits 629 in address 628 to determine whether address 628 is for prior address 620 or current address 622. If set of bits 629 matches a portion of an address range for prior set of data processing systems 612, then virtual adapter 624 identifies address 628 as prior address 620. For example, set of bits 629 may be a subnet or an address for a gateway for prior set of data processing systems 612. Similarly, if set of bits 629 matches a portion of an address range for current set of data processing systems 614, then virtual adapter 624 identifies address 628 as current address 622.

Information regarding address ranges for prior set of data processing systems 612 may be maintained by set of hypervisors 608. Further, set of hypervisors 608 may include communication management process 631 for managing communications in association with virtual adapter 624. For example, set of hypervisors 608 manages resources 605 used by plurality of virtual machines 604. Communication management process 631 may maintain information regarding current address 622 of second application 618. For example, communication management process 631 may maintain information regarding address connections used by second application 618.

Communication management environment 600 further includes plurality of virtual networks 630. In the depicted examples, plurality of virtual networks 630 handles communications for different addresses for plurality of applications 602. For example, virtual local area network 632 in plurality of virtual networks 630 sends messages between addresses for applications in plurality of applications 602. Virtual local area network 632 allows applications within virtual local area network 632 to communicate with each other as if the applications were part of the same domain, regardless of the physical location of the application.

In these illustrative embodiments, plurality of virtual networks 630 includes first virtual network 634 and second virtual network 636. First virtual network 634 and second virtual network 636 may be a local area network, such as virtual local area network 632. First virtual network 634 and second virtual network 636 may also be wide area networks for handling communications over a distributed area. Second virtual network 636 handles communications for current addresses of applications in plurality of applications 602. For example, applications in plurality of applications 602 may communicate with each other as if they are part of the same domain using second virtual network 636. Thus, for address 628 being current address 622 of second application 618, virtual adapter 624 will send a message to second virtual network 636.

Additionally, first virtual network 634 handles communications for prior addresses of applications in plurality of applications 602. First virtual network 634 is implemented to allow applications to refer to prior addresses. For example, first virtual network 634 virtualizes prior address 620 of second application 618. First application 616 may send message 626 containing prior address 620 of second application 618. For example, second application 618 was migrated. First application 616 may be unaware of the change in address for second application 618. Ordinarily, first application 616 and/or second application 618 would need to be reconfigured to update the address of second application 618 as current address 622. However, once second application 618 has been migrated, first virtual network 634 is enabled to route messages to second application 618. For example, because prior address 620 is included in first virtual network 634, virtual adapter 624 can send message 626 to first virtual network 634.

Plurality of applications 602 communicates with plurality of virtual networks 630 using plurality of virtual network interfaces 638. Plurality of virtual network interfaces 638 is a layer that provides connections between plurality of applications 602 and network hardware, such as set of network interface controllers 639. Set of network interface controllers 639 allows plurality of applications 602 to communicate over plurality of virtual networks 630. For example, first virtual network interface 640 provides a connection between plurality of applications 602 and first virtual network 634.

In these illustrative embodiments, first virtual machine 610 was configured with first virtual network interface 640 prior to migration. First virtual network interface 640 allows applications on first virtual machine 610 to communicate over plurality of virtual networks 630. Once first virtual machine 610 is migrated, communication management process 631 recreates first virtual network 634 to handle communications using prior addresses for plurality of applications 602. In addition, communication management process 631 creates second virtual network interface 642. Second virtual network interface 642 allows applications on first virtual machine 610 to communicate over plurality of virtual networks 630.

Additionally, communication management process 631 modifies first virtual machine 610. Communication management process 631 adds a new routing entry that causes messages, including prior addresses, to use first virtual network interface 640. Also, communication management process 631 establishes a default route for messages or modifies first virtual machine 610 to use second virtual network interface 642. Thus, with second virtual network interface 642 created and second virtual network 636 enabled, second application 618 may send and receive messages for both prior address 620 and current address 622.

Additionally, each time virtual machines running applications in plurality of applications 602 are migrated, illustrative embodiments maintain a virtual network interface for prior addresses. For example, when a virtual machine is migrated, communication management process 631 may create a virtual network interface to support the new Internet Protocol address for the migrated virtual machine. Thus, applications may be moved multiple times without having to be reconfigured.

For example, plurality of applications 602 includes multi-tier applications 644. Multi-tier applications 644 are applications located on more than one virtual machine. The multi-tier applications have several tiers that may be implemented in different virtual machines. The different virtual machines function together to run the multi-tier application. For example, a multi-tier application may have a presentation tier, a business logic tier, and a data access tier with each tier being interdependent and located on a different virtual machine on a different server. As a result, communication dependencies are created between the different virtual machines. By preserving the ability to use prior addresses, previous instances of the migrated application may continue to operate without needing to reconfigure addresses for the migrated application. As a result, significant amounts of time and resources may be saved during migration of virtual machines.

Additionally, if first application 616 and second application 618 are located on the same virtual machine, communications may be directly routed between the applications. For example, first virtual machine 610 processes instructions as a single physical machine. Thus, applications on the same virtual machine may communicate with each other without using a network connection, such as plurality of virtual networks 630.

The illustration of communication management environment 600 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, although the illustrative examples depict the migration of first virtual machine 610 from prior set of data processing systems 612 to current set of data processing systems 614, the different illustrative embodiments may be applied to other types of migrations for first virtual machine 610. For example, first virtual machine 610 may be migrated from one computer to another computer in a local area network. In other illustrative examples, first virtual machine 610 may be migrated from a local area network to a node in a cloud computing environment, such as cloud computing environment 50 in FIG. 2. In yet other illustrative examples, first virtual machine 610 may be migrated from one node to another node in the cloud computing environment.

As another example, virtual adapter 624 may manage communications between plurality of applications 602 without communication management process 631. Virtual adapter 624 may maintain a table of prior and current addresses for applications. Virtual adapter 624 may be configured to route messages among applications in plurality of applications 602. In other examples, multiple network interface controllers may be included in set of network interface controllers 639. One network interface controller may be provided for first virtual network 634, while second virtual network 636 may use a second network interface controller.

Figure 7:
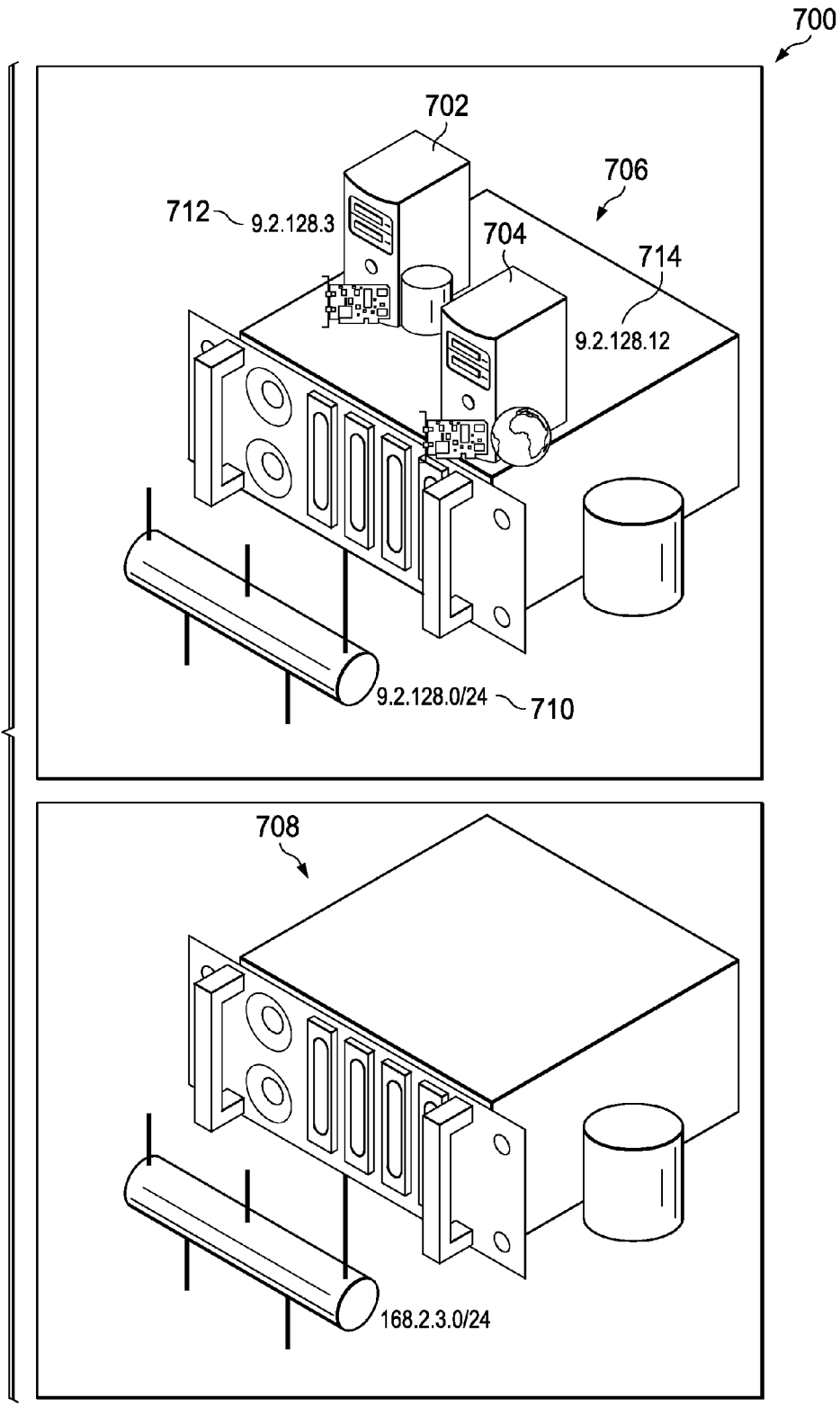
FIG. 7 is an illustration of a set of data processing systems in accordance with an illustrative embodiment.

With reference now to FIG. 7, an illustration of a set of data processing systems is depicted in accordance with an illustrative embodiment. In this illustrative example, set of data processing systems 700 is depicted prior to migration of virtual machine 702 and virtual machine 704. Source data processing system 706 is an example of one embodiment of prior set of data processing systems 612 in FIG. 6. Target data processing system 708 is an example of one embodiment of current set of data processing systems 614 in FIG. 6.

In these illustrative embodiments, source data processing system 706 has Internet Protocol address range 710 of 9.2.128.0 to 9.2.128.255, represented as 9.2.128.0/24. Virtual machine 702 and virtual machine 704 are running on source data processing system 706. Virtual machine 702 has source Internet Protocol address 712 of 9.2.128.3. Virtual machine 704 has source Internet Protocol address 714 of 9.2.128.12.

Figure 8:
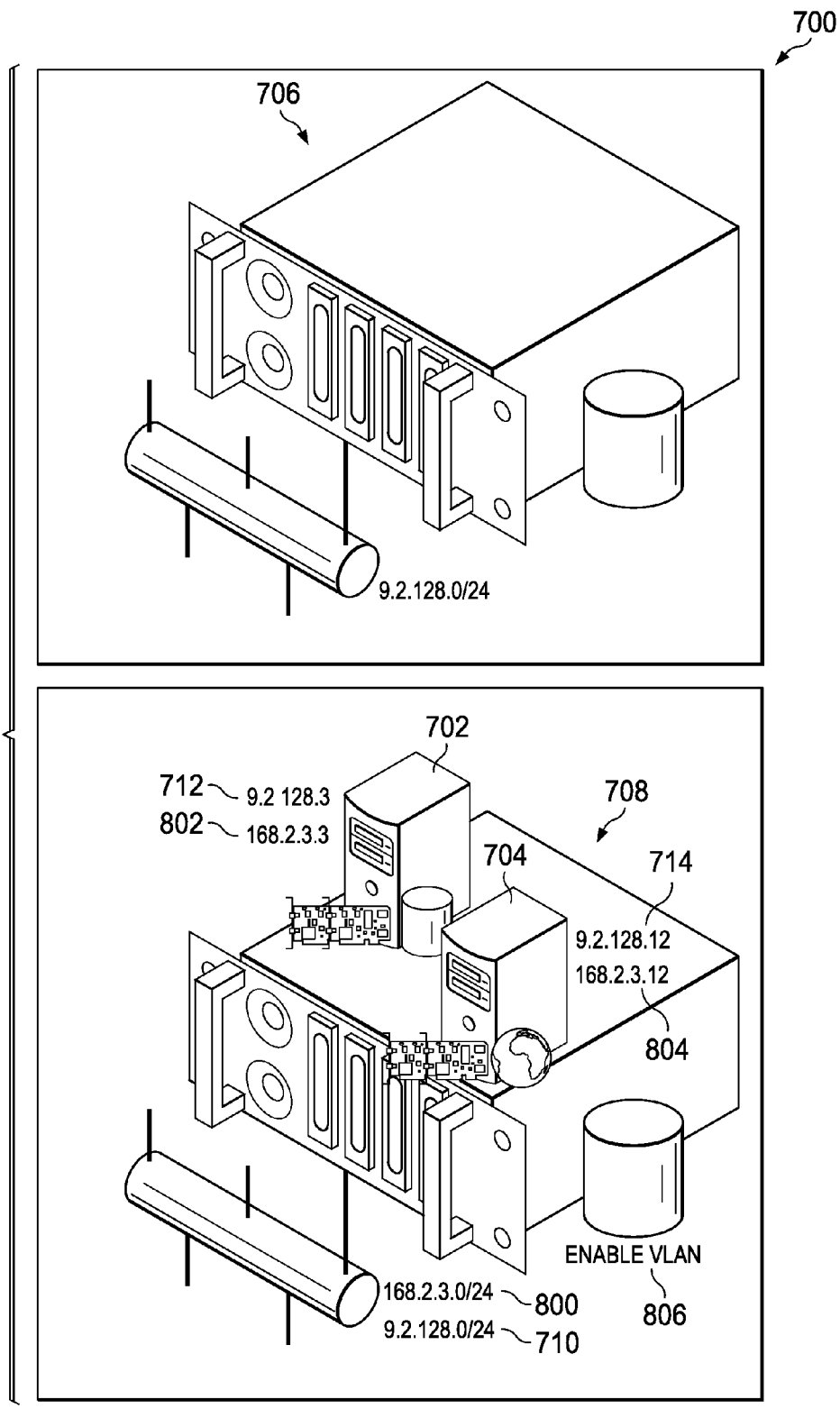
FIG. 8 is an illustration of a set of data processing systems in accordance with an illustrative embodiment.

With reference now to FIG. 8, an illustration of a set of data processing systems is depicted in accordance with an illustrative embodiment. In this illustrative example, set of data processing systems 700 is depicted after migration of virtual machine 702 and virtual machine 704. Virtual machine 702 and virtual machine 704 have been migrated from source data processing system 706 to target data processing system 708.

In these illustrative embodiments, target data processing system 708 has Internet Protocol address range 800 of 168.2.3.0 to 168.2.3.255, represented as 168.2.3.0/24. Virtual machine 702 and virtual machine 704 run on target data processing system 708. Virtual machine 702 and virtual machine 704 have target Internet Protocol address 802 and target Internet Protocol address 804, respectively.

Thus, virtual machine 702 has target Internet Protocol address 802 of 168.2.3.3. Also, virtual machine 704 has target Internet Protocol address 804 of 168.2.3.12. Virtual local area network 806 is enabled on target data processing system 708. Virtual local area network 806 allows virtual machine 702 and virtual machine 704 to use source Internet Protocol address 712 and source Internet Protocol address 714, respectively, while running on target data processing system 708.

In these illustrative embodiments, virtual local area network 806 routes messages intended for a physical location of source Internet Protocol address 712 and source Internet Protocol address 714 to another location. When messages containing one of source Internet Protocol address 712 and source Internet Protocol address 714 are received, the messages are sent to virtual local area network 806. Messages containing addresses for one of source Internet Protocol address 712 and source Internet Protocol address 714 may be identified using a virtual adapter, such as virtual adapter 624 in FIG. 6.

The address may be identified by comparing sets of bits in the address in the message with sets of bits for source data processing system 706. For example, a message containing the bits "9.2.128" as a first set of bits may be identified as an address in Internet Protocol address range 710 for source data processing system 706. When a message is identified as an address in Internet Protocol address range 710 for source data processing system 706, the message is sent to virtual local area network 806. Thus, virtual machines 702 and 704 may continue to send and receive messages at prior and current locations without having to change the Internet Protocol address configurations.

Figure 9:
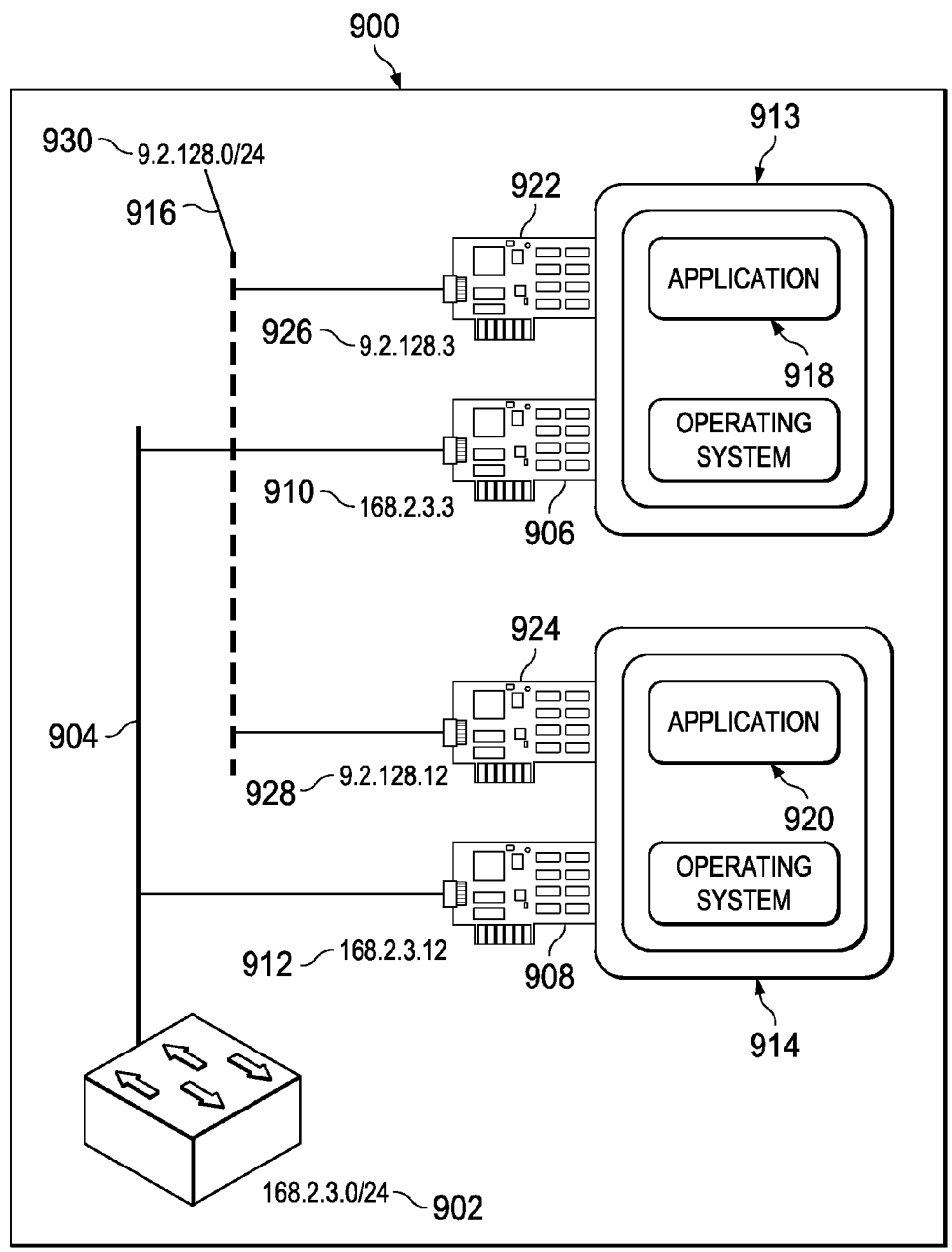
FIG. 9 is an illustration of a block diagram of architecture for a target data processing system in accordance with an illustrative embodiment.

With reference now to FIG. 9, a block diagram of architecture for a target data processing system is depicted in accordance with an illustrative embodiment. Target data processing system 900 is an example of one implementation of target data processing system 708 in FIG. 7.

Target data processing system 900 has Internet Protocol address range 902 of 168.2.3.0 to 168.2.3.255. Messages, including addresses within Internet Protocol address range 902, are routed within local area network 904. Network interface controller 906 and network interface controller 908 have Internet Protocol address 910 and Internet Protocol address 912, respectively. Network interface controller 906 and network interface controller 908 are examples of implementations of set of network interface controllers 639 in FIG. 6. Network interface controller 906 and network interface controller 908 are connected to local area network 904. Thus, network interface controller 906 and network interface controller 908 will receive messages in local area network 904 intended for virtual machine 913 and virtual machine 914, respectively.

In these illustrative embodiments, virtual local area network 916 is also implemented in target data processing system 900. Virtual local area network 916 is an example of one implementation of virtual local area network 806 in FIG. 8. Application 918 and application 920 may have been migrated to target data processing system 900. Application 918 and application 920 can communicate with each other using addresses from a prior data processing system, such as source data processing system 706 in FIG. 7, for example.

Network interface controller 922 and network interface controller 924 are enabled for virtual machine 913 and virtual machine 914, respectively. Network interface controller 922 and network interface controller 924 are assigned prior Internet Protocol address 926 and prior Internet Protocol address 928, respectively. Thus, application 918 and application 920 can communicate with each other using prior addresses for the applications. For example, virtual local area network 916 routes messages with addresses in Internet Protocol address range 930 of 9.2.128.0 to 9.2.128.24. Messages on virtual local area network 916, including prior Internet Protocol address 926 and prior Internet Protocol address 928, are received by network interface controller 922 and network interface controller 924, respectively.

The illustrations of set of data processing systems 700 in FIGS. 7 and 8, as well as target data processing system 900 in FIG. 9, are not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 10:
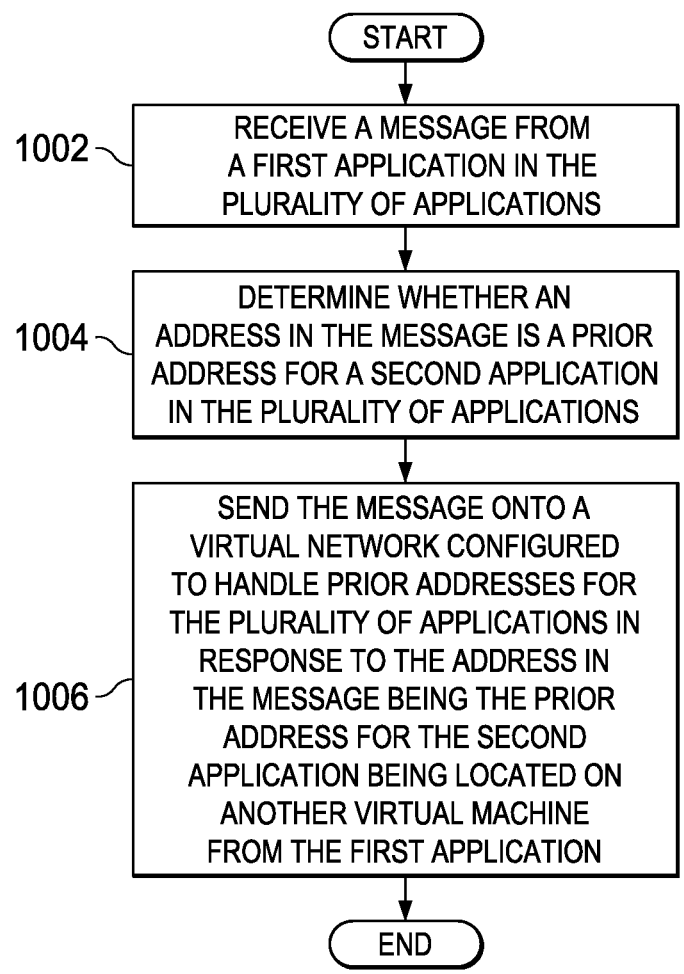
FIG. 10 is a flowchart of a process for managing communications between a plurality of applications in accordance with an illustrative embodiment.

With reference now to FIG. 10, a flowchart of a process for managing communications between a plurality of applications is depicted in accordance with an illustrative embodiment. The process illustrated in FIG. 10 may be implemented in virtual adapter 624 in FIG. 6, a virtual network in plurality of virtual networks 630 in FIG. 6, as part of software that controls virtual adapter 624, and/or in some other suitable software component.

The process begins by receiving a message from a first application in the plurality of applications (step 1002). The process then determines whether an address in the message is a prior address for a second application in the plurality of applications (step 1004). In step 1004, the second application may have been moved from a prior location having the prior address.

Thereafter, the process sends the message onto a virtual network configured to handle prior addresses for the plurality of applications in response to the address in the message being the prior address for the second application being located on another virtual machine from the first application (step 1006), with the process terminating thereafter. In step 1006, the virtual net may be a virtual local area network, such as virtual local area network 632 in FIG. 6.

Figure 11:
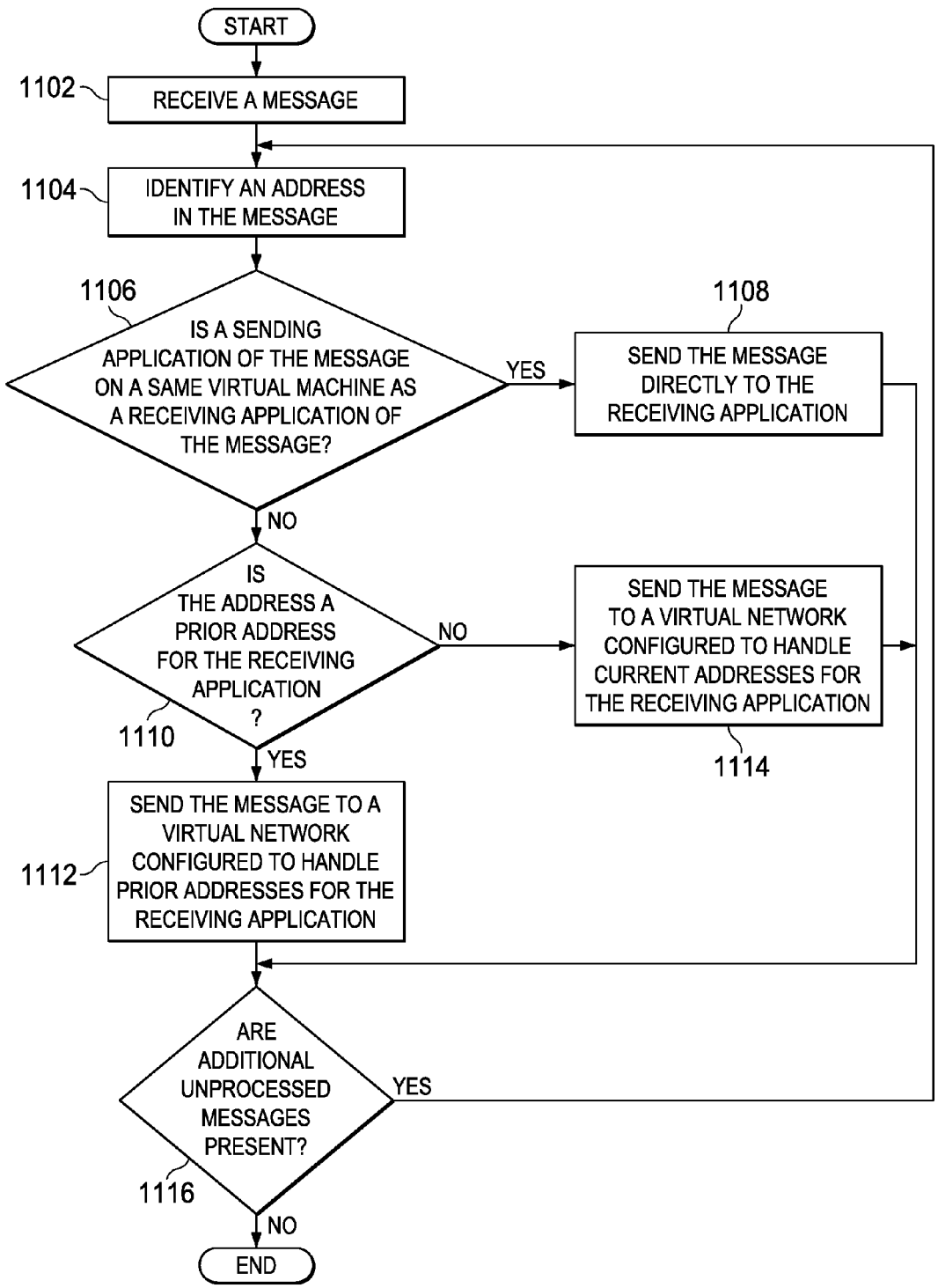
FIG. 11 is a flowchart of a process for sending a message to a receiving application in accordance with an illustrative embodiment.

With reference now to FIG. 11, a flowchart of a process for sending a message to a receiving application is depicted in accordance with an illustrative embodiment. The process illustrated in FIG. 11 may be implemented in virtual adapter 624 in FIG. 6. Further, the process may also be implemented in communication management process 631 running in set of hypervisors 608 in FIG. 6.

The process begins by receiving a message (step 1102). The process then identifies an address in the message (step 1104). Thereafter, the process determines whether a sending application of the message is on a same virtual machine as a receiving application of the message (step 1106).

If the sending application of the message is on the same virtual machine as the receiving application of the message, the process sends the message directly to the receiving application (step 1108), with the process continuing to step 1116, mentioned later. On the other hand, if the sending application of the message is not on the same virtual machine as the receiving application of the message, the process determines whether the address is a prior address of the receiving application (step 1110). In step 1110, a virtual adapter, such as virtual adapter 624 in FIG. 6, for example, may determine whether the address is the prior address. For example, the virtual adapter may compare sets of bits in the address in the message for sets of bits in an address for a prior location of the receiving application.

If the address is the prior address of the receiving application, the process sends the message to a virtual network configured to handle prior addresses for the receiving application (step 1112), with the process continuing to step 1116, mentioned later. On the other hand, if the address is not a prior address of the receiving application, the process sends the message to a virtual network configured to handle current addresses for the receiving application (step 1114). Thereafter, the process determines whether additional unprocessed messages are present (step 1116). If the process determines that there are additional unprocessed messages present, the process returns to step 1104 and identifies an address in the message. On the other hand, if the process determines that there are no additional unprocessed messages present, the process terminates.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The different illustrative embodiments allow messages sent to prior addresses for an application to be received at a current address of the application. A virtual network virtualizes the prior addresses for the application. Thus, applications can refer to other applications at prior addresses.

In this manner, the different illustrative embodiments reduce the amount of resources needed to perform an application migration. For example, the need to manually modify application configuration information needed to transfer applications is reduced.

When virtual machines, including the applications, are migrated, the communication between the applications is not interrupted, preserving dependences between virtual machines. Further, the Internet Protocol addresses for the applications may not need to be reconfigured when the virtual machines are migrated. Previous instances of applications may continue to run using prior addresses throughout the course of multiple migrations.

Thus, the different illustrative embodiments provide a method, apparatus, and computer program product for managing communications between a plurality of applications. In an illustrative embodiment, a determination is made as to whether an address in a message is a prior address for a second application in the plurality of applications in response to receiving a message from a first application in the plurality of applications. The message is sent onto a virtual network configured to handle prior addresses for the plurality of applications in response to the address in the message being the prior address for the second application being located on another virtual machine from the first application.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

What is claimed is:

1. A method for managing communications between a plurality of applications, the method comprising:
   a computer migrating a second application from a prior address on a first virtual machine to a current address on a second virtual machine, wherein the first virtual machine is provided with a first virtual network interface on that allows applications on the first virtual machine to communicate over a first virtual network;
   responsive to migrating the second application, the computer recreating the first virtual network and the first virtual network interface on the second virtual machine, wherein the first virtual network virtualizes the prior address allowing applications to refer to the prior address of the second application through the recreated first virtual network interface;
   further responsive to migrating the second application, the computer creating a second virtual network and a second virtual network interface on the second virtual machine, wherein the second virtual network virtualizes the current address allowing applications to refer to the current address of the second application through the second virtual network interface;
   responsive to receiving a message from a first application in the plurality of applications, the computer determining whether an address in the message is the prior address for the second application in the plurality of applications; and
   responsive to the address in the message being the prior address for the second application, and the second application being located on another virtual machine from the first application, the computer sending the message onto 114 the first virtual network configured to handle prior addresses for the plurality of applications.

2. The method of claim 1, wherein the determining step and the sending step are performed by a virtual adapter.

3. The method of claim 1 further comprising:
   responsive to the address in the message being the prior address for the second application being located on a same virtual machine as the first application, sending the message to the second application without sending the message onto the virtual network.

4. The method of claim 1, wherein the virtual network is a first virtual network in a plurality of virtual networks and further comprising:
   responsive to the address in the message being a current address for the second application, sending the message onto the second virtual network in the plurality of virtual networks, wherein the second virtual network is configured to handle current addresses for the plurality of applications.

5. The method of claim 1, wherein the second application is located on a current set of data processing systems in a cloud computing environment, wherein the prior address for the second application includes a set of bits corresponding to a prior set of data processing systems in the cloud computing environment that the second application is no longer located on, and further comprising:
   responsive to identifying the set of bits in the address in the message, determining that the address is the prior address for the second application.

6. The method of claim 5, wherein the virtual network is a first virtual network in a plurality of virtual networks, wherein the set of bits is a first set of bits, wherein the current set of data processing systems correspond to a second set of bits, and further comprising:
   responsive to identifying the second set of bits in the address in the message, determining that the address in the message is the current address for the second application and sending the message onto the second virtual network in the plurality of virtual networks, wherein the second virtual network is configured to handle current addresses for the plurality of applications.

7. The method of claim 1 further comprising:
   recreating the first virtual network interface for the plurality of applications; and
   receiving only messages including a set of addresses for the prior address of the second application at the recreated first virtual network interface.

8. The method of claim 1, wherein the second application is located on a current set of data processing systems in a cloud computing environment, wherein the prior address for the second application includes a set of bits corresponding to a computer system in a local area network outside the cloud computing environment that the second application is no longer located on, and further comprising:
   responsive to identifying the set of bits in the address in the message, determining that the address is the prior address for the second application.

9. The method of claim 1, wherein the first virtual network is a virtual local area network.

10. An apparatus comprising:
    a computer system configured to run a plurality of virtual machines, wherein computer system is configured to responsive to migrating a second application from a prior address on a first virtual machine to a current address on a second virtual machine, wherein the first virtual machine is provided with a first virtual network interface on that allows applications on the first virtual machine to communicate over a first virtual network, to recreate the first virtual network and the first virtual network interface on the second virtual machine, wherein the first virtual network virtualizes the prior address allowing applications to refer to the prior address of the second application through the recreated first virtual network interface; further responsive to migrating the second application, to create a second virtual network and a second virtual network interface on the second virtual machine, wherein the second virtual network virtualizes the current address allowing applications to refer to the current address of the second application through the second virtual network interface; and;

a virtual network configured to handle prior addresses for a plurality of applications; and a plurality of virtual adapters, wherein a virtual adapter in the plurality of virtual adapters is configured: to determine whether an address in a message received from a first application in the plurality of applications is a prior address for a second application in the plurality of applications and send the message onto the virtual network configured to handle prior addresses for the plurality of applications in response to the address in the message being the prior address for the second application being located on another virtual machine in the plurality of virtual machines from the first application.

11. The apparatus of claim 10, wherein the virtual adapter is further configured to send the message to the second application without sending the message onto the first virtual network or the second virtual network in response to the address in the message being the prior address for the second application being located on a same virtual machine as the first application.

12. The apparatus of claim 10, wherein the first virtual network is a first virtual network in a plurality of virtual networks and wherein the virtual adapter is configured to send the message onto the second virtual network in the plurality of virtual networks in response to the address in the message being a current address for the second application, wherein the second virtual network is configured to handle current addresses for the plurality of applications.

13. The apparatus of claim 10, wherein the second application is located on a current set of data processing systems in a cloud computing environment, wherein the prior address for the second application includes a set of bits corresponding to a prior set of data processing systems in the cloud computing environment that the second application is no longer located on, and wherein the virtual adapter is configured to determine that the address is the prior address for the second application in response to identifying the set of bits in the address in the message.

14. The apparatus of claim 13, wherein the first virtual network is a first virtual network in a plurality of virtual networks, wherein the set of bits is a first set of bits, wherein the current set of data processing systems correspond to a second set of bits, and wherein the virtual adapter is configured to determine that the address in the message is a current address for the second application and sending the message onto the second virtual network in the plurality of virtual networks in response to identifying the second set of bits in the address in the message, wherein the second virtual network is configured to handle current addresses for the plurality of applications.

15. The apparatus of claim 10 further comprising:
the first virtual network interface for the plurality of applications, wherein the first virtual network interface is configured to receive only messages that include a set of addresses for a prior location of at least one of the plurality of applications.

16. The apparatus of claim 10, wherein the first virtual network is a virtual local area network.

17. The apparatus of claim 10, wherein the virtual adapter and the first virtual network are located on the computer system.

18. A computer program product for managing communications between a plurality of applications and the computer program product comprising:
a non-transitory computer readable storage medium;
program code, stored on the computer readable storage medium, for migrating a second application from a prior address on a first virtual machine to a current address on a second virtual machine, wherein the first virtual machine is provided with a first virtual network interface on that allows applications on the first virtual machine to communicate over a first virtual network;
program code, stored on the computer readable storage medium, responsive to migrating the second application, for recreating the first virtual network and the first virtual network interface on the second virtual machine, wherein the first virtual network virtualizes the prior address allowing applications to refer to the prior address of the second application through the recreated first virtual network interface;
program code, stored on the computer readable storage medium, further responsive to migrating the second application, for creating a second virtual network and a second virtual network interface on the second virtual machine, wherein the second virtual network virtualizes the current address allowing applications to refer to the current address of the second application through the second virtual network interface;
program code, stored on the computer readable storage medium, for determining whether an address in a message is the prior address for the second application in the plurality of applications in response to receiving the message from a first application in the plurality of applications; and
program code, stored on the computer readable storage medium, for sending the message onto the first virtual network configured to handle prior addresses for the plurality of applications in response to the address in the message being the prior address for the second application, and the second application being located on another virtual machine from the first application.

19. The computer program product of claim 18, wherein the program code for determining whether the address in the message is the prior address for the second application in the plurality of applications in response to receiving the message from the first application in the plurality of applications and the program code for sending the message onto the first virtual network configured to handle prior addresses for the plurality of applications in response to the address in the message being the prior address for the second application being located on the other virtual machine from the first application are program code for a virtual adapter.

20. The computer program product of claim 18 further comprising:
program code, stored on the computer readable storage medium, for sending the message to the second application without sending the message onto the first virtual network in response to the address in the message being the prior address for the second application being located on a same virtual machine as the first application.

21. The computer program product of claim 18, wherein the first virtual network is a first virtual network in a plurality of virtual networks and further comprising:
program code, stored on the computer readable storage medium, for sending the message onto the second virtual network in the plurality of virtual networks in response to the address in the message being the current address for the second application, wherein the second virtual network is configured to handle current addresses for the plurality of applications.

22. The computer program product of claim 18, wherein the second application is located on a current set of data processing systems in a cloud computing environment, wherein the prior address for the second application includes a set of bits corresponding to a prior set of data processing systems in the cloud computing environment that the second application is no longer located on, and further comprising:

program code, stored on the computer readable storage medium, for determining that the address is the prior address for the second application in response to identifying the set of bits in the address in the message.

23. The computer program product of claim 22, wherein the first virtual network is a first virtual network in a plurality of virtual networks, wherein the set of bits is a first set of bits, wherein the current set of data processing systems correspond to a second set of bits, and further comprising:

program code, stored on the computer readable storage medium, for determining that the address in the message is the current address for the second application and sending the message onto the second virtual network in the plurality of virtual network in response to identifying the second set of bits in the address in the message, wherein the second virtual network is configured to handle current addresses for the plurality of applications.

24. The computer program product of claim 18, further comprising:

program code, stored on the computer readable storage medium, for recreating the first a virtual network interface for the plurality of applications; and program code, stored on the computer readable storage medium, for receiving only messages including a set of addresses for the prior address of the second application at the recreated first virtual network interface.

25. The computer program product of claim 18, wherein the first virtual network is a virtual local area network.

* * * * *